(No Model.)
R. BEAN.
VEHICLE WHEEL.
No. 407,769. Patented July 30, 1889.
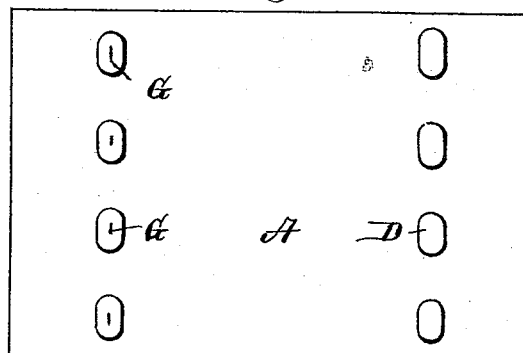
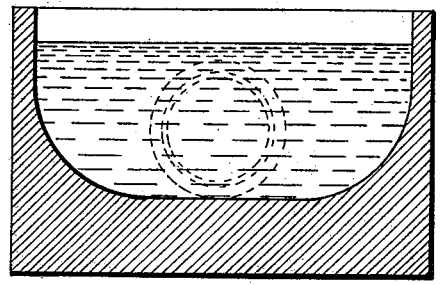
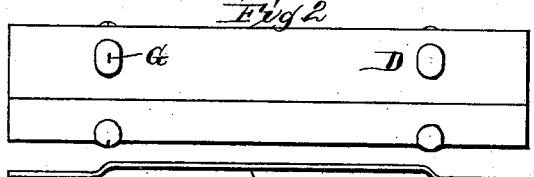
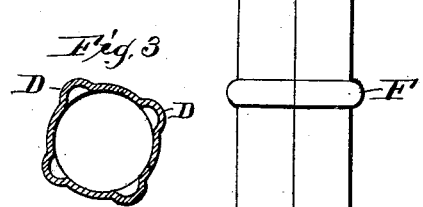
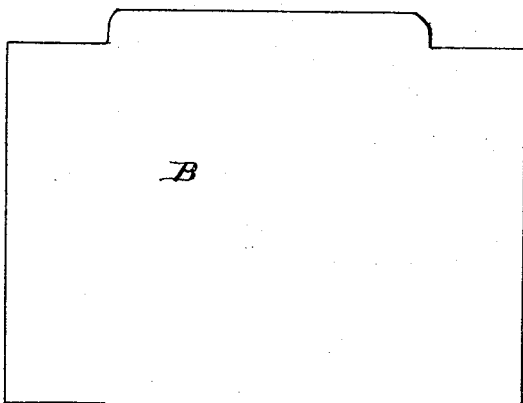
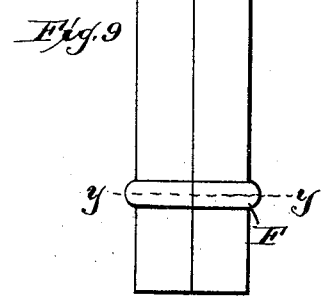
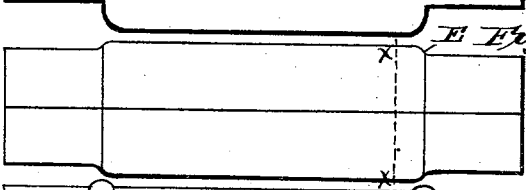
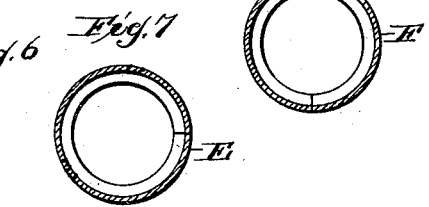
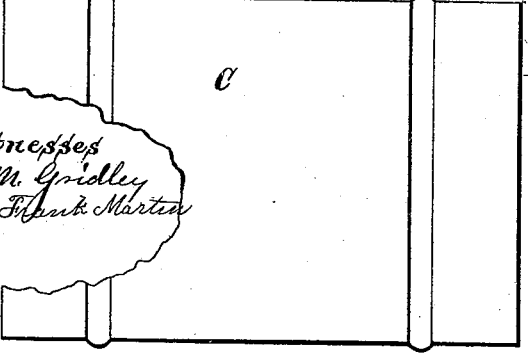
Witnesses
G. M. Gridley
O. Frank Martin
Inventor
Roscoe Bean,
By H. A. Toulmin,
his Attorney

UNITED STATES PATENT OFFICE.

ROSCOE BEAN, OF SPRINGFIELD, OHIO, ASSIGNOR TO THE TRICYCLE MANUFACTURING COMPANY, OF SAME PLACE.

VEHICLE-WHEEL.

SPECIFICATION forming part of Letters Patent No. 407,769, dated July 30, 1889.

Application filed May 17, 1889. Serial No. 311,141. (No model.)

*To all whom it may concern:*

Be it known that I, ROSCOE BEAN, a citizen of the United States, residing at Springfield, in the county of Clark and State of Ohio, have invented certain new and useful Improvements in Vehicle-Wheels, of which the following is a specification, reference being had therein to the accompanying drawings.

This invention relates to vehicle-wheels of that class used in children's bicycles, tricycles, wagons, and carriages, in which a sleeve or tube is used in conjunction with two distinct hub-sections fitted upon the sleeve, and prevented from being drawn together under the strains of the spokes by enlargements or shoulders on the tube or sleeve, and the present improvements are designed to avoid the liability of the tube or sleeve to leak and lose the lubricating-oil applied to the wheel in practice.

The object is accomplished, first, by so constructing the blanks from which the tubes or sleeves are formed or struck up that the enlargements or shoulders made by bulging the metal shall not cause such gaps or irregularities in the seams of the tubes or sleeves as cannot be readily filled by dipping the tubes or sleeves into a tin or other metallic bath, and, second, by closing the slight crack occurring between the edges of the blank when folded into tubular form by dipping or immersing the tubes or sleeves into said tin or metallic bath.

In the accompanying drawings, forming a part of this specification, and on which like reference-letters indicate corresponding parts, Figure 1 represents a blank; Fig. 2, a tube or sleeve formed of this blank; Fig. 3, a cross-section of this tube or sleeve; Fig. 4, an edge view of another form of blank; Fig. 5, a plan view of said form of blank; Fig. 6, a tube or sleeve formed of this latter blank; Fig. 7, a cross-section of this tube or sleeve on the line *x x;* Fig. 8, still another form of blank; Fig. 9, a tube or sleeve formed of said last-named blank; Fig. 10, a cross-section of such latter tube or sleeve on the line *y y;* and Fig. 11, a transverse sectional view of a trough containing a tin or other metallic bath with a tube or sleeve immersed therein, and shown in dotted lines.

The letters A, B, and C designate sheet-metal blanks of suitable size to form, when struck up or rolled, tubes or sleeves of the desired dimension. Each of these blanks is differently formed and differently treated to produce projections on them to constitute the exterior shoulders or enlargements D, E, and F on the tubes or sleeves. The blank A is treated for this purpose by bulging the body thereof at suitable intervals and in sections of convenient length from the inside outward, so as to produce the shoulders D at intervals around the circumference of the tube or sleeve. Under some conditions—the quality and thickness of the metal and the degree of the bulge, for instance—the metal may become slightly punctured, as suggested by the short lines G. This, however, will not make any difference, as the subsequent dipping operation will fill these punctures. The blank B is wider in that part which constitutes the space between the hub-sections than at the ends, for the purpose of compensating for the larger diameter of said portion of the tube or sleeve, as seen in Fig. 6. This blank is struck up or bent into the form shown in Fig. 4 before it is rolled or bent into tubular form. The blank C is likewise of greater width in the belt or zone, which is to constitute the shoulder or enlargement of the tube or sleeve, so as to compensate for the shortening of such belt by bulging the same outward, and increasing its circumference when bent or folded into tubular form. The object in thus making provisions in the blanks B and C for the increased circumference caused by forming the shoulders or enlargements is to prevent the appearance of gaps in the meeting edges of the blank when folded into tubular form, as such gaps would interfere with the perfect closing of the seam by the dipping of the tubes or sleeves in the metallic bath.

The dies or other instrumentalities for treating the blanks, and folding, rolling, or otherwise fashioning them into tubular form, do not constitute any part of the present invention, and are not, therefore, shown or described.

In Fig. 11 I have represented a trough containing a bath of molten tin or other alloy or metal, into which the tubes or sleeves, after being thus formed with shoulders or enlargements and with closely-fitting edges, leaving but a fine seam, are dipped or immersed to entirely close such seams and prevent leakage of the lubricant in practice, as well as to strengthen the tube or sleeve. The tube or sleeve thus made is strong, is very durable, is tight in its seam or joint, and is cheaply and easily manufactured. I have shown and described several forms of blanks of which to make the tubes or sleeves, with the exterior shoulders or enlargements of such character as to prevent the appearance of irregularities in the seam of the tube or sleeve produced from the blank, and I have shown and described these several forms to make it clearly understood that my invention—the improved tube or sleeve—is not dependent upon any special form of blank so long as the shoulders or enlargements are provided, and the meeting edges of the blank, when formed into a tube, preserved from such irregularities and gaps as preclude the completion and perfection of the tube or sleeve against leaking by the final step in its production—the dipping or the application of the metallic or other seam-closing fluid. The sleeve or tube secured to my present assignees in Letters Patent No. 319,777, June 9, 1885, for vehicle-wheels, is improved by the present invention.

I would further observe that it is usual to delay the dipping of the sleeve or tube, or the application thereto of the seam-closing fluid, until after the same is organized into a wheel complete, with the exception of the closing of the seam in the tube or sleeve.

Having thus fully described my invention, what I claim as new, and desire to secure by Letters Patent, is—

1. In a wheel, the tube or sleeve constructed of sheet metal and having exterior bulged shoulders, and its meeting edges from shoulder to shoulder, inclusive, in close proximity and made oil-tight by the application of a seam-closing fluid.

2. In a wheel, the tube or sleeve constructed of sheet metal, and exterior shoulders produced by bulging the blank at intervals, and its meeting edges substantially regular and in close proximity and made oil-tight by the application of seam-closing metallic fluid in a molten state.

In testimony whereof I affix my signature in presence of two witnesses.

ROSCOE BEAN.

Witnesses:
   RANDOLPH COLEMAN,
   WARREN HULL.